US011546691B2

(12) United States Patent
Chen et al.

(10) Patent No.: US 11,546,691 B2
(45) Date of Patent: Jan. 3, 2023

(54) BINAURAL BEAMFORMING MICROPHONE ARRAY

(71) Applicant: Northwestern Polytechnical University, Shanxi (CN)

(72) Inventors: Jingdong Chen, Shanxi (CN); Yuzhu Wang, Shanxi (CN); Jilu Jin, Shanxi (CN); Gongping Huang, Shanxi (CN); Jacob Benesty, Montreal (CA)

(73) Assignee: Northwestern Polytechnical University, Shanxi (CN)

( * ) Notice: Subject to any disclaimer, the term of this patent is extended or adjusted under 35 U.S.C. 154(b) by 37 days.

(21) Appl. No.: 17/273,237

(22) PCT Filed: Jun. 4, 2020

(86) PCT No.: PCT/CN2020/094296
§ 371 (c)(1),
(2) Date: Mar. 3, 2021

(87) PCT Pub. No.: WO2021/243634
PCT Pub. Date: Dec. 9, 2021

(65) Prior Publication Data
US 2022/0248135 A1 Aug. 4, 2022

(51) Int. Cl.
*H04R 3/00* (2006.01)
*G10K 11/178* (2006.01)
(Continued)

(52) U.S. Cl.
CPC ....... *H04R 3/005* (2013.01); *G10K 11/17881* (2018.01); *G10L 21/0208* (2013.01);
(Continued)

(58) Field of Classification Search
CPC .. H04R 3/005; H04R 5/027; H04R 2201/401; H04R 23/008; G10L 2021/02166
(Continued)

(56) References Cited

U.S. PATENT DOCUMENTS 8,842,861 B2 * 9/2014 Westermann .......... H04R 25/43
381/320
9,093,079 B2 * 7/2015 Kleffner .............. G10L 21/0272
(Continued)

FOREIGN PATENT DOCUMENTS

CN 102111706 A 6/2011
EP 2426950 A2 3/2012
(Continued)

OTHER PUBLICATIONS

International Search Report and Written Opinion dated Feb. 24, 2021 received in PCT/CN2020/094296, pp. 8.
(Continued)

*Primary Examiner* — Disler Paul
(74) *Attorney, Agent, or Firm* — Zhong Law, LLC

(57) ABSTRACT

A binaural beamformer comprising two beamforming filters may be communicatively coupled to a microphone array to generates two beamforming outputs, one for the left ear and the other for the right ear. The beamforming filters may be configured in such a way that they are orthogonal to each other to make white noise components in the binaural outputs substantially uncorrelated and desired signal components in the binaural outputs highly correlated. As a result, the human auditory system may better separate the desired signal from white noise and intelligibility of the desired signal may be improved.

22 Claims, 7 Drawing Sheets

(51) Int. Cl.
*G10L 21/0208* (2013.01)
*H04R 5/027* (2006.01)
*G10L 21/0216* (2013.01)

(52) U.S. Cl.
CPC .... *H04R 5/027* (2013.01); *G10L 2021/02166* (2013.01); *H04R 2201/401* (2013.01)

(58) Field of Classification Search
USPC .................................. 381/71.1, 71.6, 91–92
See application file for complete search history.

(56) References Cited

U.S. PATENT DOCUMENTS

| | | | | |
|---|---|---|---|---|
| 10,567,898 | B1 | 2/2020 | Asfaw | |
| 11,276,307 | B2 * | 3/2022 | Francis | H04W 4/40 |
| 11,276,397 | B2 * | 3/2022 | Li | G10L 21/0208 |
| 11,330,366 | B2 * | 5/2022 | Pedersen | H04R 25/554 |
| 11,330,388 | B2 * | 5/2022 | Benattar | H04S 7/303 |
| 11,425,497 | B2 * | 8/2022 | Salehin | G06V 40/19 |
| 2007/0076898 | A1 * | 4/2007 | Sarroukh | G10K 11/341 381/92 |
| 2016/0044432 | A1 * | 2/2016 | Grosche | H04S 7/308 381/17 |

FOREIGN PATENT DOCUMENTS

| | | | |
|---|---|---|---|
| WO | 2019174725 | A1 | 9/2019 |
| WO | 2019222534 | A1 | 11/2019 |
| WO | 2020014812 | A1 | 1/2020 |

OTHER PUBLICATIONS

Huang et al., "A Simple Theory and New Method of Differential Beamforming with Uniform Linear Microphone Arrays", IEEE/ACM Transactions, Mar. 16, 2020, vol. 28, pp. 1079-1093.

* cited by examiner

BINAURAL BEAMFORMING MICROPHONE ARRAY

TECHNICAL FIELD

This disclosure relates to microphone arrays and in particular, to a binaural beamforming microphone array.

BACKGROUND

Microphone arrays have been used in a wide range of applications including, for example, hearing aids, smart headphones, smart speakers, voice communications, automatic speech recognition (ASR), human-machine interfaces, and/or the like. The performance of a microphone array largely depends on its ability to extract signals of interest in noisy and/or reverberant environments. As such, many techniques have been developed to maximize the gain of the signals of interest and suppress the impact of noise, interference, and/or reflections. One such technique is called beamforming, which filters received signals according to the spatial configuration of the signal sources and the microphones in order to focus on sound originating from a particular location. Conventional beamformers with high gain, however, suffer from a lack of ability to deal with noise amplification (e.g., such as white noise amplification in specific frequency ranges) in practical situations.

BRIEF DESCRIPTION OF THE DRAWINGS

The present disclosure is illustrated by way of example, and not by way of limitation, in the figures of the accompanying drawings.

DETAILED DESCRIPTION

Figure 1:
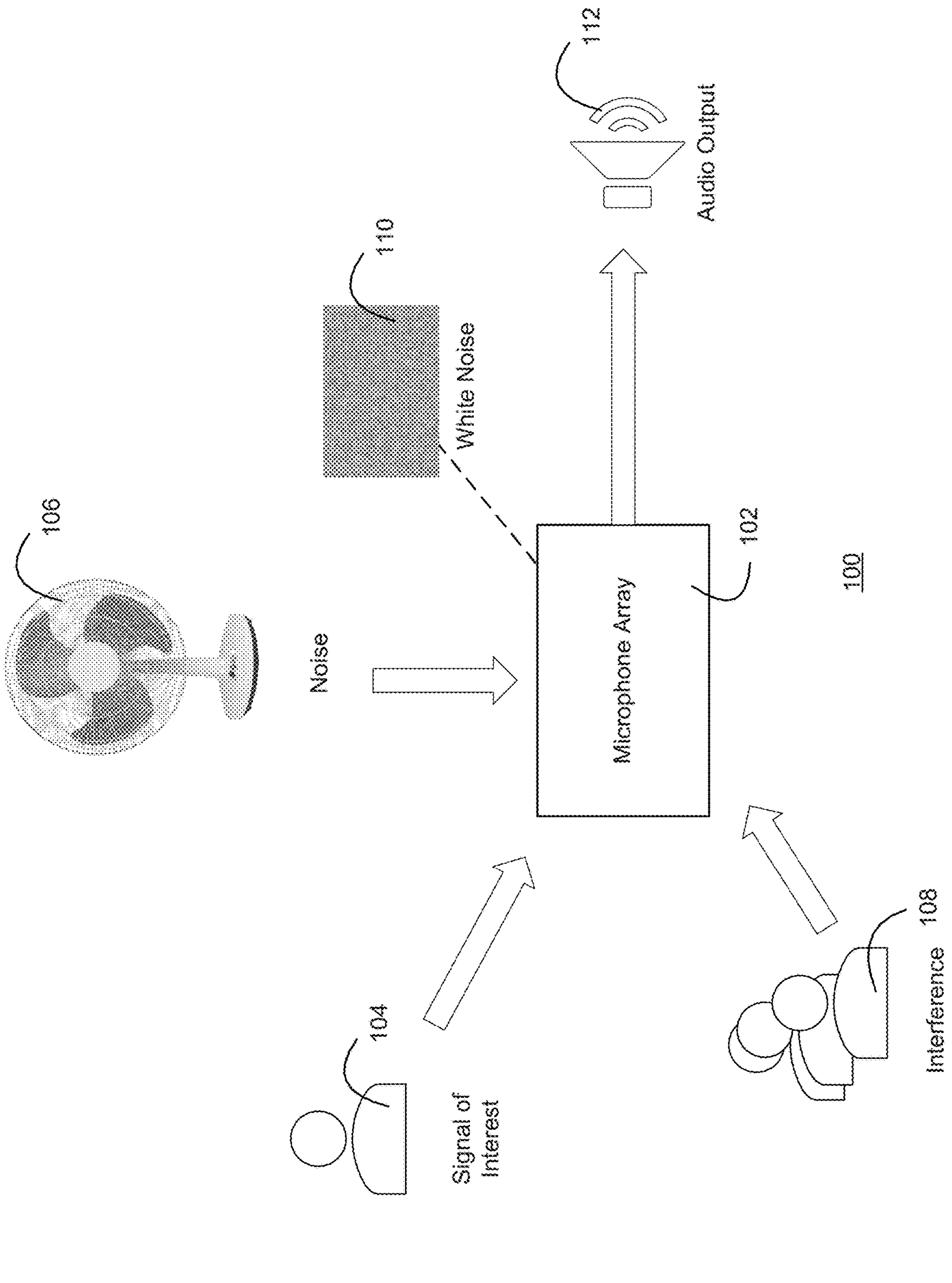
FIG. 1 is a simplified diagram illustrating an environment in which an example microphone array system may be configured to operate, according to an implementation of the present disclosure.

FIG. 1 is a simplified block diagram illustrating an environment 100 in which a microphone array 102 may be configured to operate. The microphone array 102 may be associated with one or more applications including, for example, hearing aids, smart headphones, smart speakers, voice communications, automatic speech recognition (ASR), human-machine interfaces, etc. The environment 100 may include multiple sources of audio signals. These audio signals may include a signal of interest 104 (e.g., a speech signal), a noise signal 106 (e.g., a diffused noise), an interference signal 108, a white noise signal 110 (e.g., noise generated from the microphone array 102 itself), and/or the like. The microphone array 102 may include multiple (e.g., M) microphones (e.g., acoustic sensors) configured to operate in tandem. These microphones may be positioned on a platform (e.g., linear or cursive platform) so as to receive the signal 104, 106, 108, and/or 110 from their respective sources/locations. For example, the microphones may be arranged according to a specific geometric relation with each other (e.g., along a line, on a same planar surface, spaced apart with a specific distance between each other in a three-dimensional space, etc.). Each microphone in the microphone array 102 may capture a version of an audio signal originating from a source at a particular incident angle with respect to a reference point (e.g., a reference microphone location in the microphone array 102) at a particular time. The time of sound capture may be recorded in order to determine a time delay for each microphone with respect to the reference point. The captured audio signal may be converted into one or more electronic signals for further processing.

The microphone array 102 may include or may be communicatively coupled to a processing device such as a digital signal processor (DSP) or a central processing unit (CPU). The processing device may be configured to process (e.g., filter) the signals received from the microphone array 102 and generate an audio output 112 with certain characteristics (e.g., noise reduction, speech enhancement, sound source separation, de-reverberation, etc.). For instance, the processing device may be configured to filter the signals received via the microphone array 102 such that the signal of interest 104 may be extracted and/or enhanced, and the other signals (e.g., signal 106, 108, and/or 110) may be suppressed to minimize the adverse effects they may have on the signal of interest.

Figure 2:
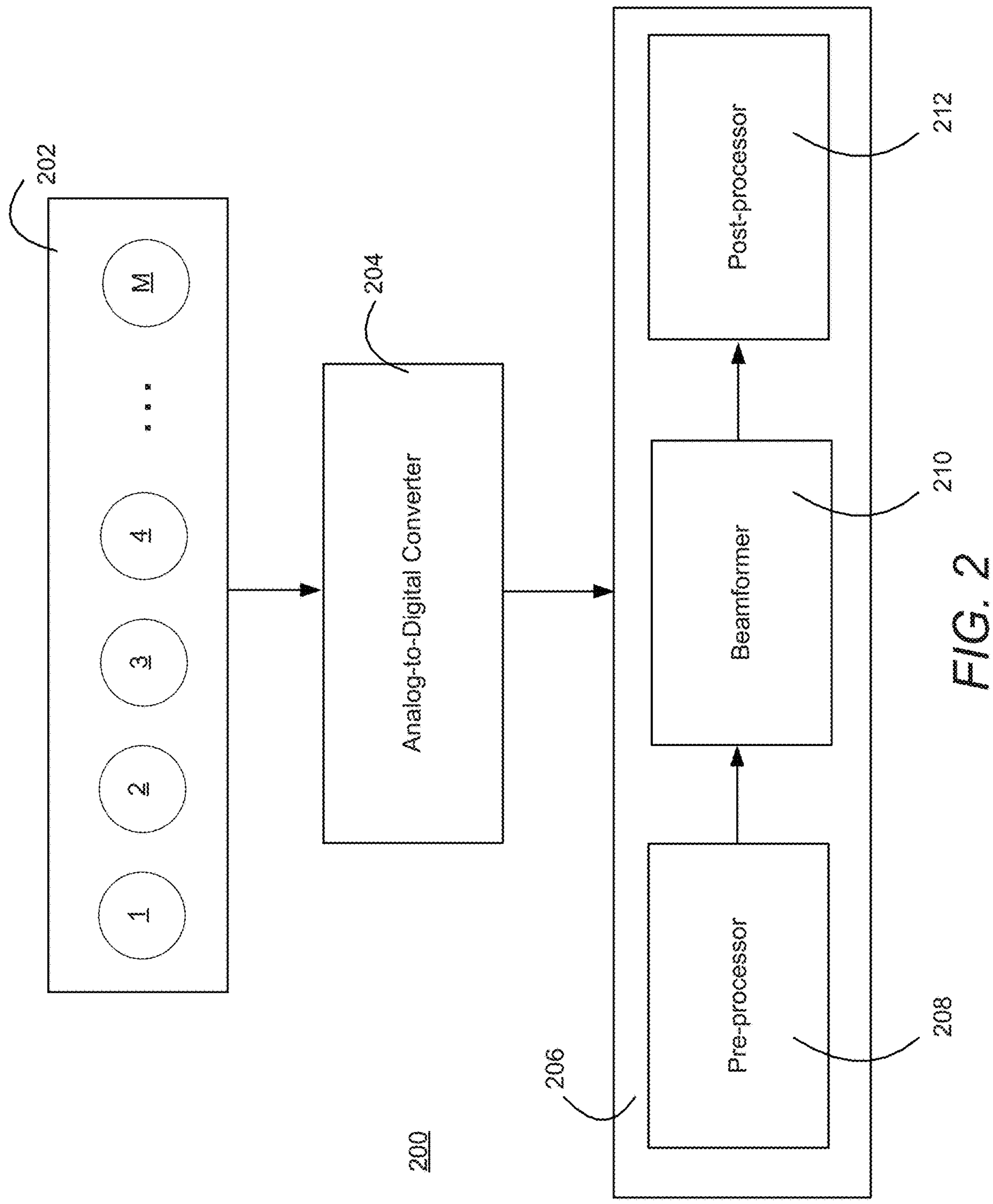
FIG. 2 is a simplified block diagram illustrating an example microphone array system, according to an implementation of the present disclosure.

FIG. 2 is a simplified block diagram illustrating an example microphone array system 200 as described herein. As shown in FIG. 2, the system 200 may include a microphone array 202, an analog-to-digital converter (ADC) 204, and a processing device 206. The microphone array 202 may include a plurality of microphones that are arranged to receive audio signals from different sources and/or at different angles. In examples, the locations of the microphones may be specified with respect to a coordinate system (x, y). The coordinate system may include an origin (O) to which the microphone locations may be specified, where the origin can be coincident with the location of one of the microphones. The angular positions of the microphones may also be defined with reference to the coordinate system. A source signal may propagate and impinge on the microphone array 202 as a plane wave from a far-field and at the speed of the sound (e.g., c=340 m/s).

Each microphone of the microphone array 202 may receive a version of the source signal with a certain time delay and/or phase shift. The electronic components of the microphone may convert the received sound signal into an electronic signal that may be fed into the ADC 204. In an example implementation, the ADC 204 may further convert the electronic signal into one or more digital signals.

The processing device 206 may include an input interface (not shown) to receive the digital signals generated by the ADC 204. The processing device 206 may further include a pre-processor 208 configured to prepare the digital signal for further processing. For example, the pre-processor 208 may include hardware circuits and/or software programs to convert the digital signal into a frequency domain representation using, for example, short-time Fourier transform or other suitable types of frequency domain transformation techniques.

The output of the pre-processor 208 may be further processed by the processing device 206, for example, via a beamformer 210. The beamformer 210 may operate to apply one or more filters (e.g., spatial filters) to the received signal to achieve spatial selectivity for the signal. In one implementation, the beamformer 210 may be configured to process the phase and/or amplitude of the captured signals such that signals at particular angles may experience constructive interference while others may experience destructive interference. The processing by the beamformer 210 may result in a desired beam pattern (e.g., a directivity pattern) being formed that enhances the audio signals coming from one or more specific directions. The capacity of such a beam pattern for maximizing the ratio of its sensitivity in a look direction (e.g., an impinging angle of an audio signal associated with a maximum sensitivity) to its average sensitivity over all directions may be quantified by one or more parameters including, for example, a directivity factor (DF).

The processing device 206 may also include a post-processor 212 configured to transform the signal produced by the beamformer 210 into a suitable form for output. For example, the post-processor 212 may operate to convert an estimate of provided by the beamformer 210 for each frequency sub-band back into the time domain so that the output of the microphone array system 200 may be intelligible to an aural receiver.

The signal and/or filtering described herein may be understood from the following description. For a source signal of interest propagating as a plane wave from an azimuth angle, θ, in an anechoic acoustic environment at the speed of sound (e.g., c=340 m/s) and impinging on a microphone array (e.g., the microphone array 202) that includes 2M omnidirectional microphones, a corresponding steering vector of length 2M may be represented as the following:

$$d(\omega,\theta)=[1 e^{-j\omega\tau_0 \cos\theta} \ldots e^{-j(2M-1)\omega\tau_0 \cos\theta}]^T$$

where j may represent an imaginary unit with $j^2=-1$, $\omega=2\pi f$ may represent the angular frequency with f>0 being the temporal frequency, $\tau_0=\delta/c$ may represent the delay between two successive sensors at the angle θ=0 with δ being the interelement spacing, and the superscript T may represent be a transpose operator. The acoustic wavelength may be represented by λ=c/f.

Based on the steering vector defined above, a frequency-domain observation signal vector of length 2M may be expressed as $$\begin{aligned} y(\omega) &= [\, Y_1(\omega) \quad Y_2(\omega) \quad \ldots \quad Y_{2M}(\omega)\,]^T \\ &= x(\omega) + v(\omega) \\ &= d(\omega, \theta_s)X(\omega) + v(\omega), \end{aligned}$$

where $Y_m(\omega)$ may represent the mth microphone signal, $x(\omega)=d(\omega, \theta_s) X(\omega)$, X(ω) may represent the zero-mean source signal of interest (e.g., the desired signal), $d(\omega, \theta_s)$ may represent a signal propagation vector (e.g., which may be in the same form as the steering vector), and v(ω) may represent the zero-mean additive noise signal vector defined similarly to y(ω).

In accordance with the above, a 2M×2M covariance matrix of y(ω) may be derived as $$\begin{aligned} \Phi_y(\omega) &\triangleq E[y(\omega)y^H(\omega)] \\ &= \phi_X(\omega)d(\omega, \theta)d^H(\omega, \theta) + \Phi_v(\omega) \\ &= \phi_X(\omega)d(\omega, \theta)d^H(\omega, \theta) + \phi_{V_1}(\omega)\Gamma_v(\omega) \end{aligned}$$

where E[•] may denote mathematical expectation, the superscript H may represent a conjugate-transpose operator, $\phi x(\omega) \triangleq E[|X(\omega)|^2]$ may represent the variance of X (ω), $\Phi_v(\omega) \triangleq E[v(\omega)\, v^H(\omega)]$ may represent the variance matrix of v(ω), $\phi_{V1}(\omega) \triangleq E[|V_1(\omega)|^2]$ may represent the variance of noise, $V_1(\omega)$, at a first sensor or microphone, and $\Gamma_v(\omega)=\Phi_v(\omega)/\phi_{V1}(\omega)$ (e.g., by normalizing $\Phi_v(\omega)$ with $\phi_{V1}(\omega)$) may represent the pseudo-coherence matrix of the noise. The variance of the noise may be assumed to be the same across multiple sensors or microphones (e.g., across all sensors or microphones).

The sensor spacing, δ, described herein may be assumed to be smaller than the acoustic wavelength λ (e.g., δ<<λ), where λ=c/f. This may imply that $\omega\tau_0$ is smaller than a 2π (e.g., $\omega\tau_0 << 2\pi$) and the true acoustic pressure differentials may be approximated by finite differences of the microphones' outputs. Further, it may be assumed that the desired source signal would propagate from the angle θ=0 (e.g., in the endfire direction). As a result, y(ω) may be expressed as $$y(\omega)=d(\omega,0)X(\omega)+v(\omega)$$

and, at the endfire, the value of a beamformer beampattern may be equal to 1 or have a maximal value.

In an example implementation of a beamformer filter, a complex weight may be applied at the output of one or more microphones (e.g., at each microphone) of the microphone array 102. The weighted outputs may then be summed together to obtain an estimate of the source signal, as illustrated below:

$$\begin{aligned} Z(\omega) &= h^H(\omega)y(\omega) \\ &= X(\omega)h^H(\omega)d(\omega, 0) + h^H(\omega)v(\omega) \end{aligned}$$

where Z(ω) may represent an estimate of the desired signal X(ω) and h(ω) may represent a spatial linear filter of length 2M that includes the complex weights applied to the output of the microphones. A distortionless constraint in the direction of the signal source may be calculated as:

$$h^H(\omega)d(\omega,0)=1,$$

and a directivity factor (DF) of the beamformer may be defined as:

$$\begin{aligned} \mathcal{D}[h(\omega)] &\triangleq \frac{|h^H(\omega)d(\omega, 0)|^2}{\frac{1}{2}\int_0^\pi |h^H(\omega)d(\omega, \theta)|^2 \sin\theta d\theta} \\ &= \frac{|h^H(\omega)d(\omega, 0)|^2}{h^H(\omega)\Gamma_d(\omega)h(\omega)}, \end{aligned}$$

where $$\Gamma_d(\omega) = \frac{1}{2}\int_0^\pi d(\omega, \theta)d^H(\omega, \theta)\sin\theta d\theta.$$

For i, j=1, 2, . . . , 2M, $[\Gamma_d(\omega)]_{i,j}$ may represent a pseudo-coherence matrix of spherically isotropic (e.g., diffused) noises and may be derived as:

$$[\Gamma_d(\omega)]_{ij} = \frac{\sin[\omega(j-i)\tau_0]}{\omega(j-i)\tau_0} = sinc[\omega(j-i)\tau_0]$$

Based on the definition and/or calculation shown above, a beamformer (referred to as a superdirective beamformer) may be represented as the following by maximizing the DF and taking into account the distortionless constraint shown above:

$$h_{SD}(\omega) = \frac{\Gamma_d^{-1}(\omega)d(\omega, 0)}{d^H(\omega, 0)\Gamma_d^{-1}(\omega)d(\omega, 0)}$$

The DF corresponding to such a beamformer may have a maximum value (e.g., given the array geometry described herein), which may be expressed as:

$$\mathcal{D}[h_{SD}(\omega)] = d^H(\omega,0)\Gamma_d^{-1}(\omega)d(\omega,0)$$

The example beamformer described herein may be capable of generating a beam pattern that is frequency invariant (e.g., because of the increase or maximization of DF). The increase in DF, however, may lead to greater noise amplification such as the amplification of white noise generated by the hardware elements of the microphones in the microphone array 102 (e.g., in a low frequency range). To reduce the adverse impact of noise amplification on the signal of interest, one may consider deploying a smaller number of microphones in the microphone array 102, regularizing the matrix $\Gamma_d(\omega)$ and/or designing the microphones array 102 with extremely low self-noise level. But these methods may be costly and difficult to implement or may negatively affect other aspects of the beamformer performance (e.g., causing the DF to decrease, the shape of beam patterns to change and/or the beam patterns to be more frequency dependent).

Implementations of the disclosure explore the impacts of perceived locations and/or directions of audio signals on the intelligibility of the signals in the human auditory system (e.g., at frequencies such as those below 1 kHz) in order to address the noise amplification issue described herein. The perception of a speech signal in the human binaural auditory system may be classified as in phase and out of phase while the perception of a noise signal (e.g., a white noise signal) may be classified as in phase, random phase or out of phase. As referenced herein, "in phase" may mean that two signal streams arriving at a binaural receiver (e.g., a receiver with two receiving channels such as a pair of headphones, a person with two ears, etc.) have substantially the same phase (e.g., approximately the same phase). "Out of phase" may mean that the respective phases of two signal streams arriving at a binaural receiver differ by approximately 180°. "Random phase" may mean that the phase relation between two signal streams arriving at a binaural receiver is random (e.g., respective phases of the signal streams differ by a random amount).

Figure 3:
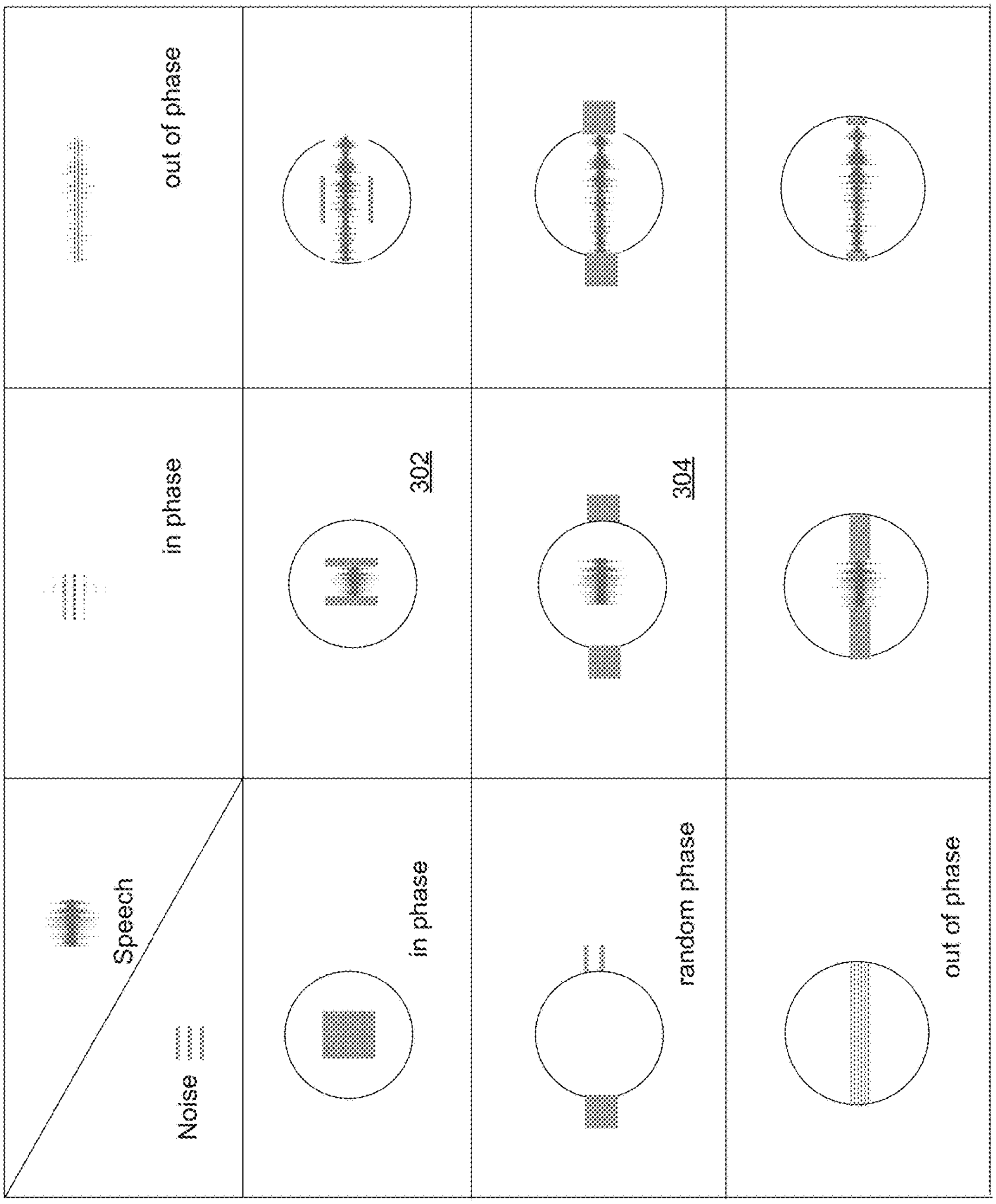
FIG. 3 is a diagram illustrating different phase relationships between a signal of interest and a noise signal and the influence of such phase relationships on the illegibility of the signal of interest.

FIG. 3 is a diagram illustrating different phase scenarios associated with a signal of interest (e.g., a speech signal) and a noise signal (e.g., a white noise) and the influence of interaural phase relations on the localization of these signals. The left column shows that the phase relations between binaural noise signal streams may be classified as in phase, random phase and out of phase. The top row shows that the phase relations between binaural speech signal streams may be classified as in phase and out of phase. The rest of FIG. 3 shows combinations of phase relations for both the speech signal and the noise signal as perceived by a binaural receiver when the signals co-exist in an environment. For example, cell 302 depicts a scenario where the speech streams and the white noise streams are both in phase at a binaural receiver (e.g., as a result of monaural beamforming) and cell 304 depicts a scenario wherein the speech streams arriving at the binaural receiver are in phase while the noise streams arriving at the receiver have a random phase relation.

The intelligibility of the speech signal may vary based on the combination of phase relations of the speech signal and white noise. Table 1 below shows a ranking of intelligibility based on the phase relationships between speech and noise, where the antiphasic and heterophasic cases correspond to higher levels of intelligibility and the homophasic cases correspond to lower levels of intelligibility.

TABLE 1

Ranking of Intelligibility Based on Speech/Noise Phase Relationships

| Intelligibility | Speech | Noise | Class |
|---|---|---|---|
| 1 | out of phase | in phase | antiphasic |
| 2 | in phase | out of phase | antiphasic |
| 3 | in phase | random phase | heterophasic |
| 4 | out of phase | random phase | heterophasic |
| 5 | in phase | in phase | homophasic |
| 6 | out of phase | out of phase | homophasic |

When the speech signal and noise are perceived to be coming from a same direction (e.g., as in the homophasic cases), the human auditory system will have difficulties separating the speech from noise and intelligibility of the speech signal will suffer. Therefore, binaural filtering such as binaural linear filtering may be performed in connection with beamforming (e.g., fixed beamforming) to generate binaural outputs (e.g., two output streams) with phase relationships corresponding to the antiphasic or heterophasic cases shown above. Each of the binaural outputs may include a signal component corresponding to a signal of interest (e.g., a speech signal) and a noise component corresponding a noise signal (e.g., white noise). The filtering may be applied in such a way that the noise components of the output streams become uncorrelated (e.g., having a random phase relationship) while the signal components of the output streams remain correlated (e.g., being in phase with each other) and/or become enhanced. Consequently, the desired signal and white noise may be perceived as coming from different directions and be better separated for improving intelligibility.

Figure 4:
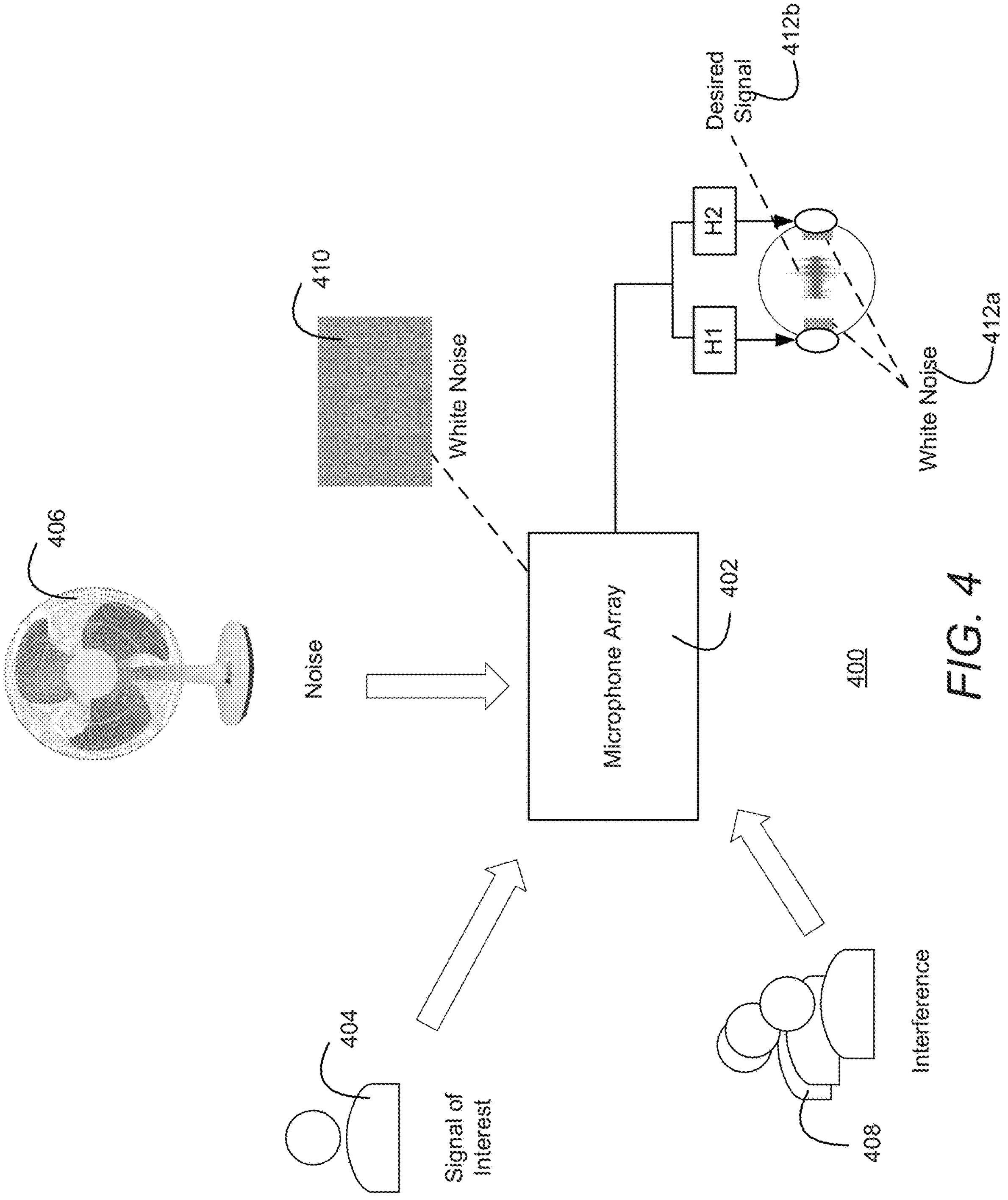
FIG. 4 is a simplified diagram illustrating an environment in which an example binaural beamformer may be configured to operate, according to an implementation of the present disclosure.

FIG. 4 is a simplified block diagram illustrating a microphone array 402 configured to apply binaural filtering to improve the intelligibility of a desired signal in an environment 400. The environment 400 may be similar to the environment 100 depicted in FIG. 1 in which respective sources for a signal of interest 404 and a white noise signal 410 co-exist. Similar to the microphone array 102 of FIG. 1, the microphone array 402 may include multiple (e.g., M) microphones (e.g., acoustic sensors) configured to operate in tandem. These microphones may be positioned to capture different versions of the signal of interest 404 (e.g., a source audio signal) from its location, for example, at different angles and/or different times. The microphones may also capture one or more other audio signals (e.g., noise 406 and/or interference 408) including the white noise 410 generated by the electronic elements of the microphone array 402 itself.

The microphone array 402 may include or may be communicatively coupled to a processing device such as a digital signal processor (DSP) or a central processing unit (CPU). The processing device may be configured to apply binaural filtering to the signal of interest 404 and/or the white noise signal 410 and generate multiple outputs for a binaural receiver. For example, the processing device may apply a first beamformer filter $h_1$ to the signal of interest 404 and the white noise signal 410 to generate a first audio output stream. The processing device may further apply a second beamformer filter $h_2$ to the signal of interest 404 and the white noise signal 410 to generate a second audio output stream. Each of the first and second audio output streams may include a white noise component 412*a* and a desired signal component 412*b*. The white noise component 412*a* may correspond to the white noise signal 410 (e.g., a filtered version of the white noise signal) and the desired signal component 412*b* may correspond to the signal of interest 404 (e.g., a filtered version of the signal of interest). The filters $h_1$ and $h_2$ may be designed as orthogonal to each other such that the white noise components 412*a* in the first and second audio output streams become uncorrelated (e.g., having a random phase relationship or an interaural coherence (IC) of approximately zero). The filters $h_1$ and $h_2$ may be further configured in such a way that the desired signal components 412*b* in the first and second audio output streams are in phase with each other (e.g., having an IC of approximately one). Consequently, a binaural receiver of the first and second audio outputs may perceive the signal of interest 404 and the white noise signal 410 as coming from different locations and/or directions and the intelligibility of the signal of interest may be improved as a result.

In one implementation, binaural linear filtering may be performed in connection with fixed beamforming. Two complex-valued linear filters (e.g., $h_1(\omega)$ and $h_2(\omega)$) may be applied to an observed signal vector such as $y(\omega)$ described herein. The respective lengths of the filters may depend on the number of microphones included in a concerned microphone array. For example, if the concerned microphone array includes 2M microphones, the length of the filters may be 2M.

Two estimates (e.g., $Z_1(\omega)$ and $Z_2(\omega)$) of a source signal (e.g., $X(\omega)$) may be obtained in response to binaural filtering of the signal. The estimates may be represented as $$\begin{aligned} Z_i(\omega) &= h_i^H(\omega)y(\omega) \\ &= X(\omega)h_i^H(\omega)d(\omega, 0) + h_i^H(\omega)v(\omega),\ i = 1, 2 \end{aligned}$$

and the variance of $Z_i(\omega)$ may be expressed as $$\begin{aligned} \phi_{Z_i}(\omega) &= h_i^H(\omega)\Phi_y(\omega)h_i(\omega) \\ &= \phi_X(\omega)|h_i^H(\omega)d(\omega, 0)|^2 + h_i^H(\omega)\Phi_v(\omega)h_i(\omega) \\ &= \phi_X(\omega)|h_i^H(\omega)d(\omega, 0)|^2 + \phi_{V_1}(\omega)h_i^H(\omega)\Gamma_v(\omega)h_i(\omega). \end{aligned}$$

where the respective meanings of $\Gamma_v(\omega)$, $\Phi_y(\omega)$, $\Phi_v(\omega)$, $\phi X(\omega)$, $\phi V1(\omega)$ and $d(\omega, 0)$ are as described herein.

Based on the above, two distortionless constraints may be determined as $$h_i^H(\omega)d(\omega,0)=1,\ i=1,2.$$

and an input signal-to-noise ratio (SNR) and an out SNR may be respectively calculated as $$iSNR(\omega) = \frac{\phi_X(\omega)}{\phi_{V_1}(\omega)}$$

and $$oSNR[h_1(\omega), h_2(\omega)] = \frac{\phi_X(\omega)}{\phi_{V_1}(\omega)} \times \frac{\sum_{i=1}^{2} |h_i^H(\omega)d(\omega, 0)|^2}{\sum_{i=1}^{2} h_i^H(\omega)\Gamma_v(\omega)h_i(\omega)}$$

In at least some scenarios (e.g., when $h_1(\omega)=i_i$ and $h_2(\omega)=i_j$, where $i_i$ and $i_j$ are, respectively, the ith and jth columns of an 2M×2M identity matrix, $I_{2M}$), the binaural output SNR may be equal to the input SNR (e.g., oSNR $[i_i(\omega), i_j(\omega)]=$ iSNR($\omega$)). Based on the input SNR and output SNR, a binaural SNR gain may be determined, for example, as $$\begin{aligned} \mathcal{G}[h_1(\omega), h_2(\omega)] &= \frac{oSNR[h_1(\omega), h_2(\omega)]}{iSNR(\omega)} \\ &= \frac{\sum_{i=1}^{2} |h_i^H(\omega)d(\omega, 0)|^2}{\sum_{i=1}^{2} h_i^H(\omega)\Gamma_v(\omega)h_i(\omega)} \end{aligned}$$

Other measures associated with binaural beamforming may also be determined, which may include, for example, a binaural white noise gain (WNG) expressed as W $[h_1(\omega), h_2(\omega)]$), a binaural directivity factor (DF) expressed as D $[h_1(\omega), h_2(\omega)]$), and a binaural beampattern expressed as $|B[h_1(\omega), h_2(\omega), \theta]|^2$. These measures may be calculated according to following:

$$\mathcal{W}[h_1(\omega), h_2(\omega)] = \frac{\sum_{i=1}^{2} |h_i^H(\omega)d(\omega, 0)|^2}{\sum_{i=1}^{2} h_i^H(\omega)h_i(\omega)}$$

$$\mathcal{D}[h_1(\omega), h_2(\omega)] = \frac{\sum_{i=1}^{2} |h_i^H(\omega)d(\omega, 0)|^2}{\sum_{i=1}^{2} h_i^H(\omega)\Gamma_v(\omega)h_i(\omega)}$$

$$|\mathcal{B}[h_1(\omega), h_2(\omega), \theta]|^2 = \frac{\sum_{i=1}^{2} |h_i^H(\omega)d(\omega, \theta)|^2}{2},$$

where the meaning of $\Gamma_d(\omega)$ has been explained above.

The localization of binaural signals in the human auditory system may depend on another measure referred to herein as the interaural coherence (IC) of the signals. The value of IC (or the modulus of IC) may increase or decrease in accordance with the correlation of the binaural signals. For example, when two audio streams of a source signal are strongly correlated (e.g., when the two audio streams are in phase with each other or when the human auditory system perceives the two audio streams as coming from a single signal source), the value of IC may reach a maximum value (e.g., 1). When the two audio streams of the source signal are substantially uncorrelated (e.g., when the two audio streams have a random phase relationship or when the human auditory system perceives the two streams as coming from two independent sources), the value of IC may reach a minimum value (e.g., 0). The value of IC may indicate or may be related to other binaural cues (e.g., interaural time difference (ITD), interaural level difference (ILD), width of a sound field, etc.) that the brain uses to localize sounds. As the IC of the sounds decreases, the capability of the brain to localize the sounds may decrease accordingly.

The effect of interaural coherence may be determined and/or understood as follows. Let A(ω) and B(ω) be two zero-mean complex-valued random variables. The coherence function (CF) between A(ω) and B(ω) may be defined as $$\gamma_{AB}(\omega) = \frac{E[A(\omega)B^*(\omega)]}{\sqrt{E[|A(\omega)|^2]E[|B(\omega)|^2]}},$$

where the superscript * represents a complex-conjugate operator. The value of $\gamma_{AB}(\omega)$ may satisfy the following relationship: $0 \le |\gamma_{AB}(\omega)|^2 \le 1$. For one or more pairs (e.g., for any pair) of microphones or sensors (i,j), the input IC of the noise may correspond to the CF between $V_i(\omega)$ and $V_j(\omega)$, as shown below.

$$\begin{aligned}\gamma_{V_iV_j}(\omega) &= \frac{E[V_i(\omega)V_j^*(\omega)]}{\sqrt{E[|V_i(\omega)|^2]E[|V_j(\omega)|^2]}} \\ &= \frac{i_i^T\Phi_v(\omega)i_j}{\sqrt{i_i^T\Phi_v(\omega)i_i \times i_j^T\Phi_v(\omega)i_j}} \\ &= \frac{i_i^T\Gamma_v(\omega)i_j}{\sqrt{i_i^T\Gamma_v(\omega)i_i \times i_j^T\Gamma_v(\omega)i_j}} \\ &= \gamma[i_i(\omega), i_j(\omega)].\end{aligned}$$

The input IC for white noise, $\gamma_w(\omega)$, and the input IC for diffused noise, $\gamma_d(\omega)$, may be as follows.

$$\gamma_w(\omega) = 0$$

$$\begin{aligned}\gamma_d(\omega) &= \frac{i_i^T\Gamma_d(\omega)i_j}{\sqrt{i_i^T\Gamma_d(\omega)i_i \times i_j^T\Gamma_d(\omega)i_j}} \\ &= [\Gamma_d(\omega)]_{ij}.\end{aligned}$$

The output IC of the noise may be defined as the CF between the filtered noises in $Z_1(\omega)$ and $Z_2(\omega)$, as shown below.

$$\begin{aligned}\gamma[h_1(\omega), h_2(\omega)] &= \frac{h_1^H(\omega)\Phi_v(\omega)h_2(\omega)}{\sqrt{h_1^H(\omega)\Phi_v(\omega)h_1(\omega) \times h_2^H(\omega)\Phi_v(\omega)h_2(\omega)}} \\ &= \frac{h_1^H(\omega)\Gamma_v(\omega)h_2(\omega)}{\sqrt{h_1^H(\omega)\Gamma_v(\omega)h_1(\omega) \times h_2^H(\omega)\Gamma_v(\omega)h_2(\omega)}}.\end{aligned}$$

In at least some scenarios (e.g., when $h_1(\omega)=i_i$ and $h_2(\omega)=i_j$), the input and output ICs may be equal, i.e., $\gamma[i_i(\omega), i_j(\omega)]=\gamma[h_1(\omega), h_2(\omega)]$. The output IC for white noise, $\gamma_w[h_1(\omega), h_2(\omega)]$ and the output IC for diffuse noise, $\gamma_d[h_1(\omega), h_2(\omega)]$, may be respectively determined as $$\gamma_w[h_1(\omega), h_2(\omega)] = \frac{h_1^H(\omega)h_2(\omega)}{\sqrt{h_1^H(\omega)h_1(\omega) \times h_2^H(\omega)h_2(\omega)}}$$

and $$\gamma_d[h_1(\omega), h_2(\omega)] = \frac{h_1^H(\omega)\Gamma_d(\omega)h_2(\omega)}{\sqrt{h_1^H(\omega)\Gamma_d(\omega)h_1(\omega) \times h_2^H(\omega)\Gamma_d(\omega)h_2(\omega)}}$$

When the filters $h_1(\omega)$ and $h_2(\omega)$ are collinear, the following may be true:

$$h_1(\omega)=\varsigma(\omega)h_2(\omega),$$

where $\varsigma(\omega)\neq 0$ may be a complex-valued number, and all of $|\gamma[h_1(\omega), h_2(\omega)]|$, $|\gamma_w[h_1(\omega), h_2(\omega)]|$ and $|\gamma_d[h_1(\omega), h_2(\omega)]|$ may have a value close to one (e.g., $|\gamma[h_1(\omega), h_2(\omega)]|=|\gamma_w[h_1(\omega), h_2(\omega)]|=|\gamma_w[h_1(\omega), h_2(\omega)]|=1$). Consequently, not only will a desired source signal be perceived as being coherent (e.g., fully coherent), other signals (e.g., noise) will also be perceived as being coherent, and the combined signals (e.g., the desired source signal plus noise) may be perceived as coming from the same direction. As a result, the human auditory system may have difficulties separating the signals and the intelligibility of the desired signal may be affected.

When the filters $h_1(\omega)$ and $h_2(\omega)$ are orthogonal to each other (e.g., $h_1(\omega)\ h_2(\omega)=0$), separation between the desired source signal and noise (e.g., white noise) may be improved. The following explains how such orthogonal filters may be derived and their effects on the separation between the desired signal and noise, and on the enhanced intelligibility of the desired signal.

The matrix $\Gamma_d(\omega)$ described herein may be symmetric and may be diagonalized as $$U^T(\omega)\Gamma_d(\omega)U(\omega)=\Lambda(\omega)$$

where $$U(\omega)=[u_1(\omega)u_2(\omega)\ \ldots\ u_{2M}(\omega)]$$

may be an orthogonal matrix that satisfies the following condition $$U^T(\omega)U(\omega)=U(\omega)U^T(\omega)=I_{2M}$$

and $$\Lambda(\omega)=\mathrm{diag}[\lambda_1(\omega),\lambda_2(\omega),\ \ldots\ ,\lambda_{2M}(\omega)]$$

may be a diagonal matrix.

The orthonormal vectors $u_1(\omega), u_2(\omega), \ldots, u_{2M}(\omega)$ may be the eigenvectors corresponding, respectively, to the eigenvalues $\lambda_1(\omega), \lambda_2(\omega), \ldots, \lambda_{2M}(\omega)$ of the matrix $\Gamma_d(\omega)$, where $\lambda_1(\omega) \ge \lambda_2(\omega) \ge \ldots \ge \lambda_{2M}(\omega) > 0$. As such, the orthogonal filters that may maximize the output IC of diffused noise described herein may be determined as $$\begin{cases} h_1(\omega) = \dfrac{u_1(\omega)+u_{2M}(\omega)}{\sqrt{2}} = q_{+,1}(\omega) \\ h_2(\omega) = \dfrac{u_1(\omega)-u_{2M}(\omega)}{\sqrt{2}} = q_{-,1}(\omega) \end{cases}$$

The first maximum mode of the CF may be as follows:

$$\gamma_d[q_{+,1}(\omega),q_{-,1}(\omega)]=\lambda_{+,1}(\omega),$$

with corresponding vectors $q_{+,1}(\omega)$ and $q_{-,1}(\omega)$, where $$\lambda_{\mp,1} = \frac{\lambda_1(\omega) - \lambda_{2M}(\omega)}{\lambda_1(\omega) + \lambda_{2M}(\omega)} = \frac{\lambda_{-,1}(\omega)}{\lambda_{+,1}(\omega)}.$$

All the M maximum modes (from m=1, 2, . . . , M) of the CF may satisfy the following $$\gamma_d[q_{+,m}(\omega), q_{-,m}(\omega)] = \lambda_{\mp,m}(\omega),$$

with corresponding vectors $q_{+,m}(\omega)$ and $q_{-,m}(\omega)$, where $$\lambda_{\mp,m} = \frac{\lambda_m(\omega) - \lambda_{2M-m+1}(\omega)}{\lambda_m(\omega) + \lambda_{2M-m+1}(\omega)} = \frac{\lambda_{-,m}(\omega)}{\lambda_{+,m}(\omega)}$$

and $$\begin{cases} q_{+,1}(\omega) = \dfrac{u_m(\omega) + u_{2M-m+1}(\omega)}{\sqrt{2}} \\ q_{-,1}(\omega) = \dfrac{u_m(\omega) - u_{2M-m+1}(\omega)}{\sqrt{2}} \end{cases}$$

Based on the above, the following may be true:

$$\lambda_{\mp,1}(\omega) \geq \lambda_{\mp,m}(\omega) \geq \ldots \geq \lambda_{\mp,M}(\omega)$$

From the two sets of vectors $q_{+,m}(\omega)$ and $q_{-,m}(\omega)$, m=1, 2, . . . , M, two semi-orthogonal matrices of size 2M×M may be formed as:

$$Q_+(\omega) = [q_{+,1}(\omega) q_{+,2}(\omega) \ldots q_{+,M}(\omega)],$$

$$Q_-(\omega) = [q_{-,1}(\omega) q_{-,2}(\omega) \ldots q_{-,M}(\omega)],$$

where $$Q_+^T(\omega) Q_+(\omega) = Q_-^T(\omega) Q_-(\omega) = I_M$$

$$Q_+^T(\omega) Q_-(\omega) = Q_-^T(\omega) Q_+(\omega) = 0$$

with $I_M$ being an M×M identity matrix.

The following may also be true:

$$Q_+^T(\omega)\Gamma_d(\omega)Q_-(\omega) = Q_-^T(\omega)\Gamma_d(\omega)Q_+(\omega) = \Lambda_-(\omega),$$

$$Q_+^T(\omega)\Gamma_d(\omega)Q_+(\omega) = Q_-^T(\omega)\Gamma_d(\omega)Q_-(\omega) = \Lambda_+(\omega),$$

where $$\Lambda_-(\omega) = \mathrm{diag}[\lambda_{-,1}(\omega), \lambda_{-,2}(\omega), \ldots, \lambda_{-,M}(\omega)],$$

$$\Lambda_+(\omega) = \mathrm{diag}[\lambda_{+,1}(\omega), \lambda_{+,2}(\omega), \ldots, \lambda_{+,M}(\omega)],$$

are two diagonal matrices of size M×M, with diagonal elements $\lambda_{-,m}(\omega) = \lambda_m(\omega) - \lambda_{2M-m+1}(\omega)$ and $\lambda_{+,m}(\omega) = \lambda_m(\omega) + \lambda_{2M-m+1}(\omega)$.

Let N be a positive integer with 2≤N≤M, two semi-orthogonal matrices of size 2M×N may be defined as the following:

$$Q_{+,:N}(\omega) = [\, q_{+,1}(\omega) \quad q_{+,2}(\omega) \quad \ldots \quad q_{+,N}(\omega) \,],$$

$$Q_{-,:N}(\omega) = [\, q_{-,1}(\omega) \quad q_{-,2}(\omega) \quad \ldots \quad q_{-,N}(\omega) \,],$$

In an example implementation, the orthogonal filters described herein may take the following forms:

$$\begin{cases} h_1(\omega) = Q_{+,:N}(\omega)\overline{h}_{:N}(\omega) \\ h_2(\omega) = Q_{-,:N}(\omega)\overline{h}_{:N}(\omega) \end{cases}$$

where $$\overline{h}_{:N}(\omega) = [\, \overline{H}_1(\omega) \quad \overline{H}_2(\omega) \quad \ldots \quad \overline{H}_N(\omega) \,] \neq 0$$

may represent a common complex-valued filter of length N. For this class of orthogonal filters, the output IC for diffuse noise may be calculated as $$\gamma_d[h_1(\omega), h_2(\omega)] = \frac{\overline{h}_{:N}^H(\omega)\Lambda_{-,N}(\omega)\overline{h}_{:N}(\omega)}{\overline{h}_{:N}^H(\omega)\Lambda_{+,N}(\omega)\overline{h}_{:N}(\omega)} = \gamma_d[\overline{h}_{:N}(\omega)],$$

where $$\Lambda_{-,N}(\omega) = \mathrm{diag}[\lambda_{-,1}(\omega), \lambda_{-,2}(\omega), \ldots, \lambda_{-,N}(\omega)]$$

$$\Lambda_{+,N}(\omega) = \mathrm{diag}[\lambda_{+,1}(\omega), \lambda_{+,2}(\omega), \ldots, \lambda_{+,N}(\omega)]$$

and $$1 \geq \gamma[\overline{h}_{:1}(\omega)] \geq \gamma[\overline{h}_{:2}(\omega)] \geq \ldots \geq \gamma[\overline{h}_{:M}(\omega)] \geq 0$$

Based on the above, the binaural WNG, DF, and power beampattern may be respectively determined as the following:

$$\mathcal{W}[\overline{h}_{:N}(\omega)] = \frac{\overline{h}_{:N}^H(\omega)C(\omega,0)C^H(\omega,0)\overline{h}_{:N}(\omega)}{2\overline{h}_{:N}^H(\omega)\overline{h}_{:N}(\omega)},$$

$$\mathcal{D}[\overline{h}_{:N}(\omega)] = \frac{\overline{h}_{:N}^H(\omega)C(\omega,0)C^H(\omega,0)\overline{h}_{:N}(\omega)}{2\overline{h}_{:N}^H(\omega)\Lambda_{+,N}(\omega)\overline{h}_{:N}(\omega)},$$

and $$|\mathcal{B}[\overline{h}_{:N}(\omega),\theta]|^2 = \frac{\overline{h}_{:N}^H(\omega)C(\omega,\theta)C^H(\omega,\theta)\overline{h}_{:N}(\omega)}{2},$$

where $$C(\omega,\theta) = [\, Q_{+,:N}^T(\omega)d(\omega,\theta) \quad Q_{-,:N}^T(\omega)d(\omega,\theta) \,]$$

may be a matrix of size N×2 and the distortionless constraint may be $$C^H(\omega,0)\overline{h}_{:N}(\omega) = 1 = \begin{bmatrix} 1 \\ 1 \end{bmatrix}$$

with N≥2.

The variance of $Z_i(\omega)$ may be derived from the above as:

$$\phi_{Z_1}(\omega) = \phi_X(\omega) + \phi_{V_1}(\omega) \times \overline{h}_{:N}^H(\omega) Q_{\pm:N}^T(\omega)\Gamma_v(\omega)Q_{\pm:N}(\omega)\overline{h}_{:N}(\omega),$$

where $Q_{\pm,:N}(\omega)=Q_{+,:N}(\omega)$ for $\phi_{Z1}(\omega)$ and $Q_{\pm,:N}(\omega)=Q_{-,:N}(\omega)$ for $\phi_{Z2}(\omega)$. In the case of diffuse-plus-white noise (e.g., $\Gamma_d(\omega)=\Gamma_d(\omega)+I_{2M}$), the variance of $Z_i(\omega)$ may be simplified to $$\phi_{Z1}(\omega)=\phi_X(\omega)+\phi_{V_1}(\omega)\times[\overline{h}_{:N}^H(\omega)\Lambda_{+,N}(\omega)\overline{h}_{:N}(\omega)+\overline{h}_{:N}^H(\omega)\overline{h}_{:N}(\omega)],$$

which shows that $\phi_{Z1}(\omega)$ may be equal to $\phi_{Z2}(\omega)$ (e.g., $\phi_{Z1}(\omega)=\phi_{Z2}(\omega)$).

Further, the cross-correlation of the two estimates $Z_1(\omega)$ and $Z_2(\omega)$ may be determined as follows:

$$\phi_{Z_1Z_2}(\omega)=E[Z_1(\omega)Z_2^*(\omega)]=\phi_X(\omega)+\phi_{V_1}(\omega)\times\overline{h}_{:N}^H(\omega)Q_{+,:N}^T\Gamma_v(\omega)Q_{-,:N}^T(\omega)\overline{h}_{:N}(\omega)$$

In the of diffuse-plus-white noise (e.g., $\Gamma_d(\omega)=\Gamma_d(\omega)+I_{2M}$), this cross-correlation may become $$\phi_{Z_1Z_2}(\omega)=\phi_X(\omega)+\phi_{V_1}(\omega)\times\overline{h}_{:N}^H(\omega)\Lambda_{-,N}(\omega)\overline{h}_{:N}(\omega),$$

which may not depend on white noise. For $\Gamma_v(\omega)=\Gamma_d(\omega)+I_{2M}$, the output IC for the estimated signal may be determined as $$\gamma_{Z_1Z_2}(\omega)=\frac{\phi_{Z_1Z_2}(\omega)}{\sqrt{\phi_{Z_1}(\omega)\phi_{Z_2}(\omega)}}=\frac{iSNR(\omega)+\overline{h}_{:N}^H(\omega)\Lambda_{-,N}(\omega)\overline{h}_{:N}(\omega)}{iSNR(\omega)+\overline{h}_{:N}^H(\omega)\Lambda_{+,N}(\omega)\overline{h}_{:N}(\omega)+\overline{h}_{:N}^H(\omega)\overline{h}_{:N}(\omega)}$$

From the above, it may be seen that the localization cues of an estimated signal may depend (e.g., mostly) on those of the desired signal in some scenarios (e.g., for large input SNRs), while in other scenarios (e.g., for low SNRs), the localization cues of the estimated signal may depend (e.g., mostly) on those of the diffuse-plus-white noise. Hence, a first binaural beamformer (e.g., a binaural superdirective beamformer) may be obtained by minimizing the sum of filtered diffuse noise signals subject to the distortionless constraint described herein. The summation may be performed, for example, as:

$$\min_{\overline{h}_{:N}(\omega)} 2\overline{h}_{:N}^H(\omega)\Lambda_{+,N}(\omega)\overline{h}_{:N}(\omega)$$
$$\text{s.t. } \overline{h}_{:N}^H(\omega)C(\omega,0)=1^T,$$

from which the following may be derived:

$$\overline{h}_{:N,BSD}(\omega)=\Lambda_{+,N}^{-1}(\omega)C(\omega,0)\times[C^H(\omega,0)\Lambda_{+,N}^{-1}(\omega)C(\omega,0)]^{-1}1$$

and the corresponding DF may be determined as:

$$\mathcal{D}[\overline{h}_{:N,BSD}(\omega)]=\frac{1}{1^T[C^H(\omega,0)\Lambda_{+,N}^{-1}(\omega)C(\omega,0)]^{-1}1}$$

Consequently, the first binaural beamformer may be represented by the following:

$$\begin{cases} h_{1,BSD}(\omega)=Q_{+,:N}(\omega)\overline{h}_{:N,BSD}(\omega) \\ h_{2,BSD}(\omega)=Q_{-,:N}(\omega)\overline{h}_{:N,BSD}(\omega) \end{cases}$$

A second binaural beamformer (e.g., a second binaural superdirective beamformer) may be obtained by maximizing the DF described herein. For example, when $$\overline{h}_{:N}'=\sqrt{2}\Lambda_{+,N}^{1/2}(\omega)\overline{h}_{:N}(\omega)$$

the DF shown above may be rewritten as:

$$\mathcal{D}[\overline{h}_{:N}'(\omega)]=\frac{\overline{h}_{:N}'^H(\omega)C'(\omega,0)C'^H(\omega,0)\overline{h}_{:N}'(\omega)}{\overline{h}_{:N}'^H(\omega)\overline{h}_{:N}'(\omega)}$$

where $$C'(\omega,0)=\frac{1}{\sqrt{2}}\Lambda_{+,N}^{-1/2}(\omega)C(\omega,0)$$

$C'(\omega,0)\,C'^H(\omega,0)$ may represent a N×N Hermitian matrix and the rank of the matrix may be equal to 2. Since there are two constrains (e.g., distortionless constraints) to fulfill, two eigenvectors, denoted $t'_1(\omega)$ and $t'_2(\omega)$, may considered. These eigenvectors may correspond to two nonnull eigenvalues, denoted $\lambda t'_1(\omega)$ and $\lambda t'_2(\omega)$, of the matrix $C'(\omega,0)\,C'^H(\omega,0)$. As such, the filter that maximizes the DF as rewritten above with two degrees of freedom (since there are two constraints to be fulfilled) may be as follows:

$$\overline{h}_{:N,BSD}'(\omega)=\alpha_1'(\omega)t_1'(\omega)+\alpha_2'(\omega)t_2'(\omega)=T_{1:2}'(\omega)\alpha'(\omega),$$

where $$\alpha_1'(\omega)=[\,\alpha_1'(\omega)\quad\alpha_2'(\omega)\,]^T\neq 0$$

may be an arbitrary complex-valued vector of length 2 and $T'_{1:2}(\omega)$ may be determined as:

$$T'_{1:2}(\omega)=[t'_1(\omega)t'_2(\omega)]$$

Hence, the filter that maximizes the DF described above may be expressed as:

$$\overline{h}_{:N,BSD,2}(\omega)=\frac{1}{\sqrt{2}}\Lambda_{+,N}^{-1/2}(\omega)T_{1:2}'(\omega)\alpha'(\omega)$$

and the corresponding DF may be determined as:

$$\mathcal{D}[\overline{h}_{:N,BSD,2}(\omega)]=\frac{\sum_{i=1}^{2}\lambda_{t_i'}(\omega)|\alpha_i'(\omega)|^2}{\sum_{i=1}^{2}|\alpha_i'(\omega)|^2}$$

Based on the above, the followings may be derived:

$$\alpha'(\omega)=\sqrt{2}[C^H(\omega,0)\Lambda_{+,N}^{-1/2}(\omega)T'_{1:2}(\omega)]^{-1}1$$

$$\overline{h}_{:N,BSD,2}(\omega)=\Lambda_{+,N}^{-1/2}(\omega)T'_{1:2}(\omega)\times[C^H(\omega,0)\Lambda_{+,N}^{-1/2}(\omega)T'_{1:2}(\omega)]^{-1}1$$

And the second binaural beamformer may be determined as:

$$\begin{cases} h_{1,BSD,2}(\omega)=Q_{+,:N}(\omega)\overline{h}_{:N,BSD,2}(\omega) \\ h_{2,BSD,2}(\omega)=Q_{-,:N}(\omega)\overline{h}_{:N,BSD,2}(\omega) \end{cases}$$

By including two sub-beamforming filters (e.g., each for one of the binaural channels) in a binaural beamformer and making the filters orthogonal to each other, the IC of the white noise components in the beamformer's binaural outputs may be decreased (e.g., minimized). In some implementations, the IC of the diffuse noise components in the beamformer's binaural outputs may also be increased (e.g., maximized). The signal components (e.g., the signal of interest) in the beamformer's binaural outputs may be in phase while the white noise components in the outputs may have a random phase relationship. This way, upon receiving the binaural outputs from the beamformer, the human auditory system may better separate the signal of interest from white noise and attenuate the effects of white noise amplification.

Figure 5:
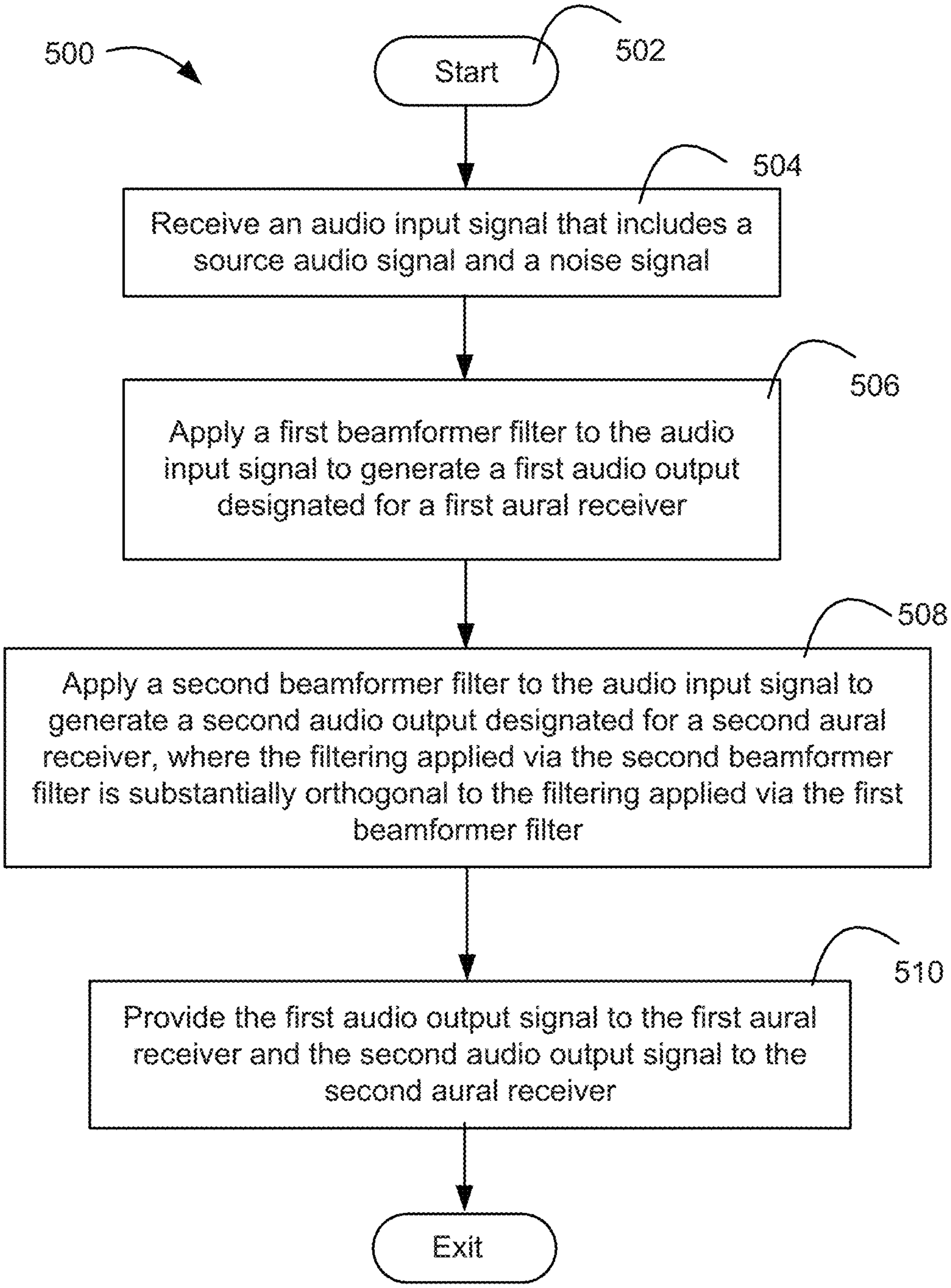
FIG. 5 is a flow diagram illustrating a method that may be executed by an example binaural beamformer comprising two orthogonal beamforming filters.

FIG. 5 is a flow diagram illustrating a method 500 that may be executed by an example beamformer (e.g., the beamformer 210 of FIG. 2) comprising two orthogonal filters. The method 500 may be performed by processing logic that includes hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 5, the method 500 may be executed by a processing device (e.g., the processing device 206) associated with a microphone array (e.g., the microphone array 102 in FIG. 1, 202 in FIG. 2, or 402 in FIG. 4) at 502. At 504, the processing device may receive an audio input signal including a source audio signal (e.g., a signal of interest) and a noise signal (e.g., white noise). At 506, the processing device may apply a first beamformer filter to the audio input signal including the signal of interest and the noise signal to generate a first audio output designated for a first aural receiver. The first audio output may include a first source signal component (e.g., representing the signal of interest) and a first noise component (e.g., representing the white noise) characterized by respective first phases. At 508, the processing device may apply a second beamformer filter to the audio input signal including the signal of interest and the noise signal to generate a second audio output designated for a second aural receiver. The second audio output may include a second source signal component (e.g., representing the signal of interest) and a second noise component (e.g., representing the white noise) characterized by respective second phases. The first and second beamformer filters may be constructed in a manner such that the noise components of the two outputs are uncorrelated (e.g., have random phase relationship) and the source signal components of the two outputs are correlated (e.g., in phase with each other). At 510, the first and second audio outputs may be provided to respective aural receivers or respective audio channels. For example, the first audio output may be provided to the first aural receiver (e.g., for the left ear) while the second audio output may be designated for the second aural receiver (e.g., for the right ear). The interaural coherence (IC) of the white noise components in the outputs may be minimized (e.g., have a value of approximately zero) while that of the signal components in the outputs may be maximized (e.g., have a value of approximately one).

Figure 6:
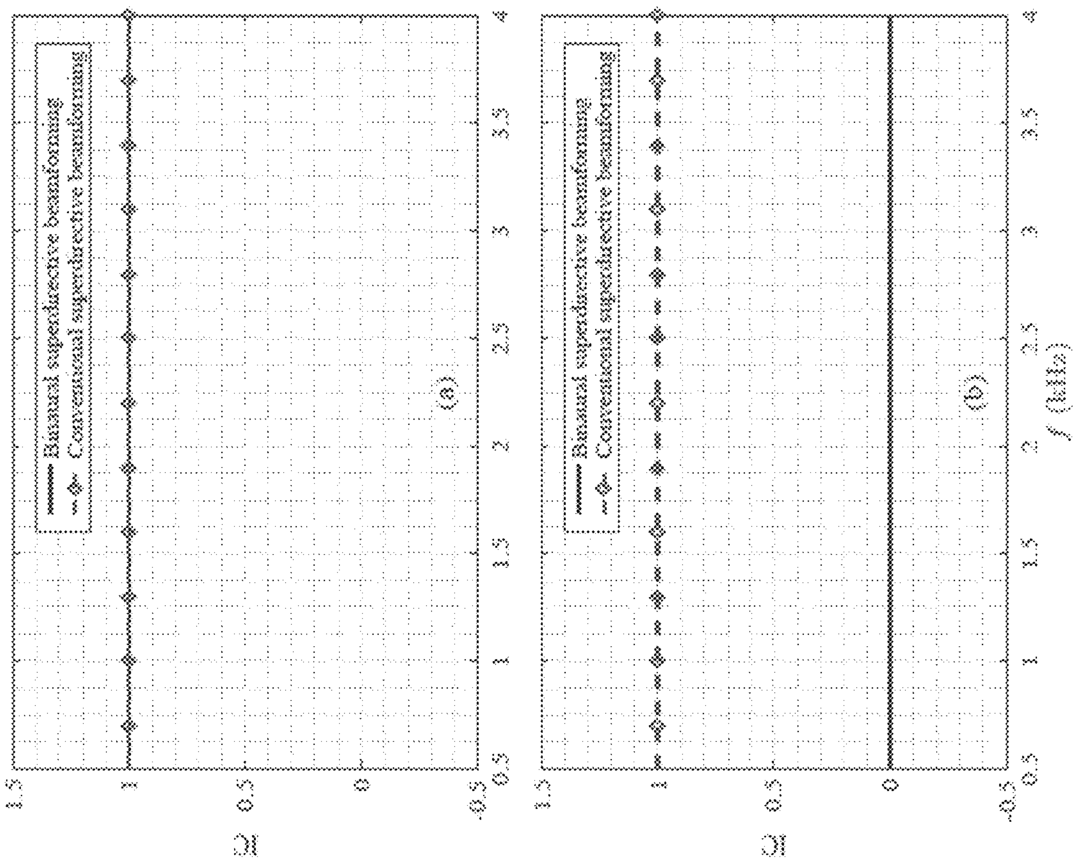
FIG. 6 is a plot showing simulated output interaural coherence of an example binaural beamformer as described herein and a conventional beamformer in connection with a desired signal and a white noise signal.

FIG. 6 is a plot comparing simulated output IC of an example binaural beamformer as described herein and a conventional beamformer in connection with a desired signal and white noise. The top half of the figure shows that the output IC of the desired signal for both the binaural and conventional beamformers equals to one, while the bottom half of the figure shows that the output IC of white noise for the binaural beamformer equals to zero and that for the conventional beamformer equals to one. This demonstrates that in the two output signals of the binaural beamformer, the signal component (e.g., the desired signal) is substantially correlated, while the white noise component is substantially uncorrelated. As such, the output signals correspond to the heterophasic case discussed herein, in which the desired signal and white noise are perceived as coming from two separate directions/locations in space.

The binaural beamformer described herein may also possess one or more of other desirable characteristics. For example, while the beampattern generated by the binaural beamformer may change in accordance with the number microphones included in a microphone array associated with the beamformer, the beampattern may be substantially invariant with respect to frequency (e.g., be substantially frequency-invariant). Further, the binaural beamformer can not only provide better separation between a desired signal and a white noise signal but also produce a higher white noise gain (WNG) when compared to a conventional beamformer of the same order (e.g., first-, second-, third-, and fourth-order).

Figure 7:
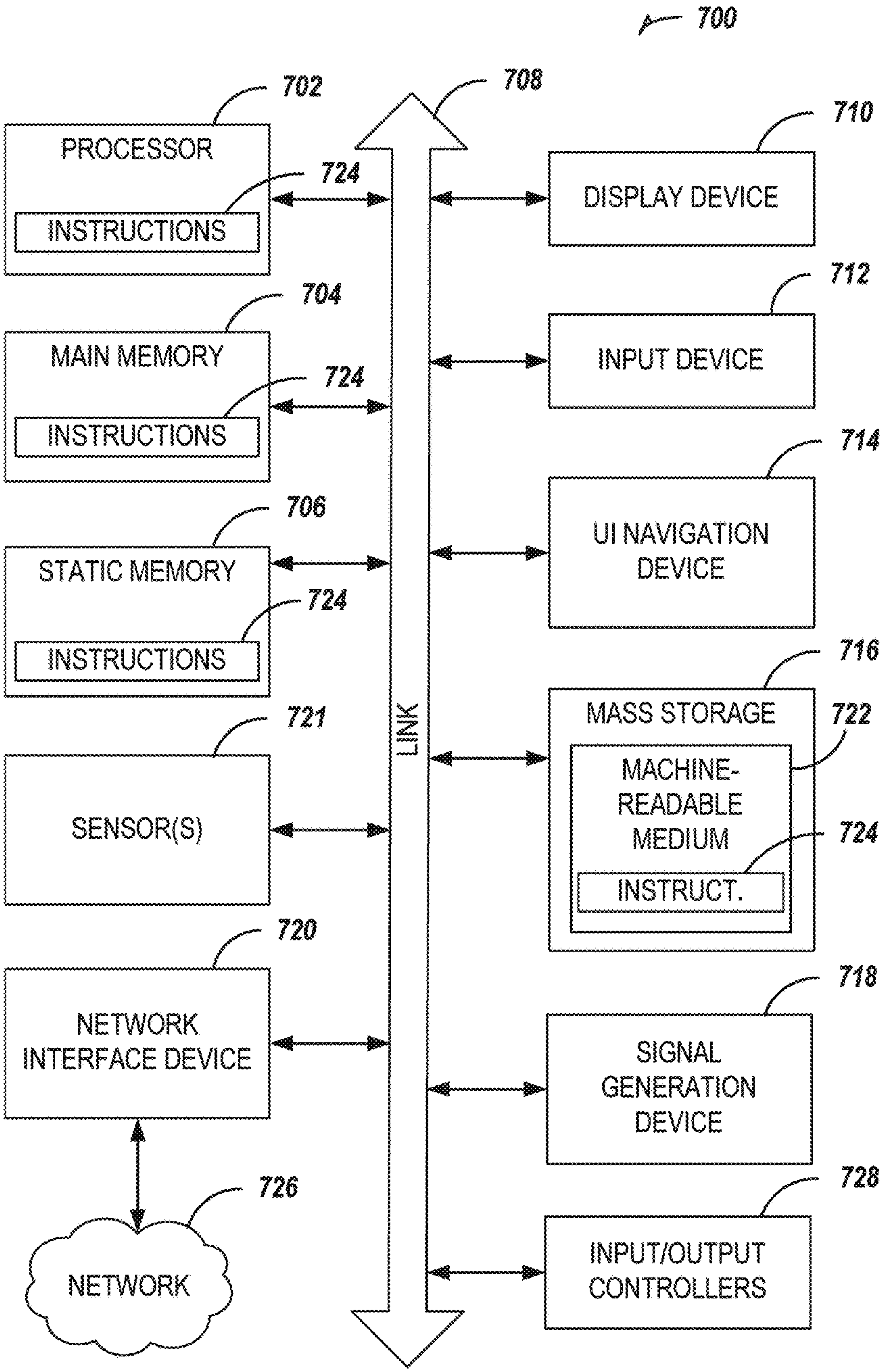
FIG. 7 is a block diagram illustrating an exemplary computer system, according to an implementation of the present disclosure.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A method implemented by a processing device communicatively coupled to a microphone array comprising a number M of microphones, where M is greater than one, the method comprising:

receiving, from the microphone array, an audio input signal comprising a source audio signal and a noise signal;

filtering, by the processing device executing a first beamformer filter associated with the microphone array, the audio input signal to generate a first audio output signal designated for a first aural receiver, the first audio output signal comprising a first audio signal component corresponding to the source audio signal and a first noise component corresponding to the noise signal;

filtering, by the processing device executing a second beamformer filter associated with the microphone array, the audio input signal to generate a second audio output signal designated for a second aural receiver, the second audio output comprising a second audio signal component corresponding to the source audio and a second noise component corresponding to the noise signal, wherein the filtering performed through the second beamformer filter is substantially orthogonal to the filtering performed through the first beamformer filter, resulting in that the first noise component is substantially uncorrelated with the second noise components; and providing the first audio output signal through a first signal link to the first aural receiver and the second audio output signal through a second signal link to the second aural receiver, wherein the first signal link is separate from the second signal link.

2. The method of claim 1, wherein the first and second audio signal components are substantially in phase with each other and wherein the first and second noise components have a random phase relationship with each other.

3. The method of claim 1, wherein an interaural coherence value between the first and second noise components has a value substantially equal to zero.

4. The method of claim 1, wherein an interaural coherence value between the first and second audio signal components is substantially equal to one.

5. The method of claim 1, wherein the first audio signal component is substantially correlated with the second audio signal component.

6. The method of claim 1, wherein an inner product of a first vector value representing the first beamformer filter and a second vector value representing the second beamformer filter is substantially equal zero.

7. The method of claim 1, wherein providing the first audio output signal to the first aural receiver and the second audio output signal to the second aural receiver comprises simultaneously providing the first audio output signal to the first aural receiver and the second audio output signal to the second aural receiver.

8. The method of claim 1, wherein the first aural receiver is configured to the provide the first audio output to the left ear of a user and the second aural receiver is configured to provide the second audio output to the right ear of the user.

9. The method of claim 1, further comprising applying beamforming to the source audio signal to create a beampattern that is substantially frequency-invariant.

10. The method of claim 1, wherein the filtering performed through at least one of the first beamformer filter or the second beamformer filter maximizes a directivity factor associated with the microphone array under a distortionless constraint.

11. A microphone array system, comprising:

a data store; and a processing device, communicatively coupled to the data store and to a number M of microphones of a microphone array, where M is greater than one, to:

receive, from the microphone array, an audio input signal comprising a source audio signal and a noise signal;

filter, by executing a first beamformer filter associated with the microphone array, the audio input signal to generate a first audio output signal designated for a first aural receiver, the first audio output comprising a first audio signal component corresponding to the source audio signal and a first noise component corresponding to the noise signal;

filter, by executing a second beamformer filter associated with the microphone array, the audio input signal to generate a second audio output designated for a second aural receiver, the second audio output signal comprising a second audio signal component corresponding to the source audio and a second noise component corresponding to the noise signal, wherein the filtering performed through the second beamformer filter is substantially orthogonal to the filtering performed through the first beamformer filter, resulting in that the first noise component is substantially uncorrelated with the second noise components; and provide the first audio output signal through a first signal link to the first aural receiver and the second audio output signal through a second signal link to the second aural receiver, wherein the first signal link is separate from the second signal link.

12. The microphone array system of claim 11, wherein the first and second audio signal components are substantially in phase with each other and wherein the first and second noise components have a random phase relationship with each other.

13. The microphone array system of claim 11, wherein an interaural coherence value between the first and second noise components has a value substantially equal to zero.

14. The microphone array system of claim 11, wherein an interaural coherence value between the first and second audio signal components is substantially equal to one.

15. The microphone array system of claim 11, wherein the first audio signal component is substantially correlated with the second audio signal component.

16. The microphone array system of claim 11, wherein an inner product of a first vector value representing the first beamformer filter and a second vector value representing the second beamformer filter is substantially equal zero.

17. The microphone array system of claim 11, wherein to provide the first audio output signal to the first aural receiver and the second audio output signal to the second aural receiver, the processing device is to simultaneously provide the first audio output signal to the first aural receiver and the second audio output signal to the second aural receiver.

18. The microphone array system of claim 11, wherein the first aural receiver is configured to the provide the first audio output to the left ear of a user and the second aural receiver is configured to provide the second audio output to the right ear of the user.

19. The microphone array system of claim 11, wherein the processing device is further configured to apply beamforming to the source audio signal to create a beampattern that is substantially frequency-invariant.

20. The microphone array system of claim 11, wherein at least one of the first beamformer filter or the second beamformer filter executed by the processing device maximizes a directivity factor associated with the microphone array under a distortionless constraint.

21. A non-transitory machine-readable storage medium storing instructions which, when executed, cause a processing device to:

receive, from a microphone array of M microphones, an audio input signal comprising a source audio signal and a noise signal, where M is greater than one;

filter, by executing a first beamformer filter associated with the microphone array, the audio input signal to generate a first audio output signal designated for a first aural receiver, the first audio output comprising a first audio signal component corresponding to the source audio signal and a first noise component corresponding to the noise signal;

filter, by executing a second beamformer filter associated with the microphone array, the audio input signal to generate a second audio output signal designated for a second aural receiver, the second audio output signal comprising a second audio signal component corresponding to the source audio and a second noise component corresponding to the noise signal, wherein the filtering performed through the second beamformer filter is substantially orthogonal to the filtering performed through the first beamformer filter, resulting in that the first noise component is substantially uncorrelated with the second noise components; and provide the first audio output through a first signal link to the first aural receiver and the second audio output signal through a second signal link to the second aural receiver, wherein the first signal link is separate from the second signal link.

22. The non-transitory machine-readable storage medium of claim 21, wherein the first and second audio signal components are substantially in phase with each other and wherein the first and second noise components have a random phase relationship with each other.

* * * * *